(12) United States Patent
Getson et al.

(10) Patent No.: US 11,144,829 B2
(45) Date of Patent: *Oct. 12, 2021

(54) SECURE INTELLIGENT NETWORKED ARCHITECTURE WITH DYNAMIC FEEDBACK

(71) Applicant: Capitalogix IP Owner, LLC, Coppell, TX (US)

(72) Inventors: Howard M. Getson, Coppell, TX (US); Sean Vallie, Lantana, TX (US); Robert Jump, Cincinnati, OH (US); Wincenty Borodziewicz, Plano, TX (US)

(73) Assignee: Capitalogix IP Owner, LLC, Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,676

(22) Filed: Aug. 1, 2019

(65) Prior Publication Data

US 2019/0354722 A1 Nov. 21, 2019

Related U.S. Application Data

(63) Continuation of application No. 15/400,823, filed on Jan. 6, 2017, now Pat. No. 10,387,679.

(51) Int. Cl.
*G06N 3/08* (2006.01)
*G06F 21/62* (2013.01)
(Continued)

(52) U.S. Cl.
CPC ............ *G06N 3/08* (2013.01); *G06F 21/6263* (2013.01); *G06N 3/006* (2013.01); *H04L 63/20* (2013.01); *H04L 67/1002* (2013.01)

(58) Field of Classification Search
CPC . G06N 3/08; G06N 3/02; G06N 3/006; G06F 21/6263; H04L 63/20; H04L 67/1002
See application file for complete search history.

(56) References Cited

U.S. PATENT DOCUMENTS

| 5,761,442 A | 6/1998 | Barr et al. |
| 6,578,068 B1 | 6/2003 | Bowman-Amuah |

(Continued)

FOREIGN PATENT DOCUMENTS

| CN | 101276454 A | 10/2008 |
| CN | 102136099 A | 7/2011 |

(Continued)

OTHER PUBLICATIONS

Pan et al.; "An Intelligent Agent Framework for Enterprise Integration", 1991, IEEE Transactions on Syystems, Man, and Cybernetics, vol. 211, No. 6, pp. 1391-1408. (Year: 1991).*

(Continued)

*Primary Examiner* — Matthew Smithers
(74) *Attorney, Agent, or Firm* — Carr & Ferrell LLP

(57) ABSTRACT

Provided herein are exemplary systems and methods including the generation of a superior strategy for deployment to real time actual conditions with dynamic feedback to the secure intelligent networked architecture in order for adjustments to be made to the strategy being deployed to the real time actual conditions and the learned generation of subsequent strategies.

17 Claims, 3 Drawing Sheets

(51) Int. Cl.
  *H04L 29/06* (2006.01)
  *H04L 29/08* (2006.01)
  *G06N 3/00* (2006.01)

(56) References Cited

U.S. PATENT DOCUMENTS

| | | | |
|---|---|---|---|
| 6,735,580 | B1 | 5/2004 | Li et al. |
| 7,644,863 | B2 | 1/2010 | Chen et al. |
| 7,805,344 | B2 | 9/2010 | Smith |
| 7,882,014 | B2 | 2/2011 | Shapiro et al. |
| 8,250,102 | B2 | 8/2012 | Madhavarapu et al. |
| 8,285,658 | B1 | 10/2012 | Kellas-Dicks et al. |
| 8,442,885 | B1 | 5/2013 | Carrie et al. |
| 8,626,522 | B2 | 1/2014 | Greenwood |
| 9,529,634 | B1 | 12/2016 | Hsu et al. |
| 9,626,503 | B2 | 4/2017 | Jung et al. |
| 9,934,000 | B2 | 4/2018 | Sherwood et al. |
| 10,387,679 | B2* | 8/2019 | Getson ................ H04L 63/20 |
| 10,423,800 | B2 | 9/2019 | Getson et al. |
| 10,795,893 | B2 | 10/2020 | Getson et al. |
| 10,824,753 | B2 | 11/2020 | Getson et al. |
| 2002/0095400 | A1 | 7/2002 | Johnson et al. |
| 2003/0046159 | A1 | 3/2003 | Ebrahimi et al. |
| 2003/0217129 | A1 | 11/2003 | Knittel et al. |
| 2004/0205110 | A1 | 10/2004 | Hinshaw |
| 2005/0203892 | A1* | 9/2005 | Wesley ............... G06F 21/6227 |
| 2006/0101062 | A1 | 5/2006 | Godman et al. |
| 2007/0288466 | A1 | 12/2007 | Bohannon et al. |
| 2009/0012760 | A1* | 1/2009 | Schunemann ..... G06Q 10/0639 703/6 |
| 2009/0125370 | A1 | 5/2009 | Blondeau et al. |
| 2011/0153445 | A1 | 6/2011 | Huang et al. |
| 2011/0185063 | A1 | 7/2011 | Head et al. |
| 2011/0246298 | A1* | 10/2011 | Williams ............... G06Q 30/08 705/14.53 |
| 2012/0023035 | A1 | 1/2012 | Kuhnle et al. |
| 2012/0257820 | A1 | 10/2012 | Sanghvi et al. |
| 2012/0259762 | A1 | 10/2012 | Tarighat et al. |
| 2012/0324446 | A1 | 12/2012 | Fries et al. |
| 2013/0024395 | A1 | 1/2013 | Clark et al. |
| 2013/0138577 | A1 | 5/2013 | Sisk |
| 2013/0211990 | A1 | 8/2013 | Zhong |
| 2013/0325918 | A1 | 12/2013 | Sherwood et al. |
| 2014/0052421 | A1 | 2/2014 | Allen et al. |
| 2014/0122480 | A1 | 5/2014 | Jung et al. |
| 2014/0215033 | A1 | 7/2014 | Ravichandran et al. |
| 2015/0127628 | A1* | 5/2015 | Rathod ................. G06F 16/955 707/710 |
| 2015/0254556 | A1 | 9/2015 | Getson et al. |
| 2015/0254765 | A1 | 9/2015 | Getson et al. |
| 2015/0302303 | A1 | 10/2015 | Hakim |
| 2016/0021157 | A1 | 1/2016 | Duerring |
| 2016/0335532 | A1* | 11/2016 | Sanghavi ............... H04L 51/02 |
| 2017/0018034 | A1 | 1/2017 | Wainman et al. |
| 2017/0180272 | A1* | 6/2017 | Bernath ............... H04L 49/3054 |
| 2018/0004969 | A1 | 1/2018 | Getson et al. |
| 2018/0196964 | A1 | 7/2018 | Getson et al. |
| 2019/0340380 | A1 | 11/2019 | Getson et al. |
| 2020/0201871 | A1 | 6/2020 | Getson et al. |
| 2021/0049293 | A1 | 2/2021 | Getson et al. |

FOREIGN PATENT DOCUMENTS

| | | | |
|---|---|---|---|
| CN | 102333126 | A | 1/2012 |
| CN | 102393894 | A | 3/2012 |
| CN | 102523166 | A | 6/2012 |
| CN | 102663649 | A | 9/2012 |
| CN | 102713849 | A | 10/2012 |
| CN | 103412792 | A | 11/2013 |
| CN | 103493008 | A | 1/2014 |
| CN | 106462794 | A | 2/2017 |
| CN | 106462795 | A | 2/2017 |
| CN | 109804360 | A | 5/2019 |
| CN | 110383245 | A | 10/2019 |
| CN | 106462795 | B | 5/2020 |
| CN | 111488975 | A | 8/2020 |
| ID | 202000594 | A | 3/2020 |
| SG | 11201607309 | T | 9/2019 |
| SG | 11201607320 | T | 10/2019 |
| WO | WO2013082119 | A1 | 6/2013 |
| WO | WO2015134991 | A1 | 9/2015 |
| WO | WO2015134992 | A1 | 9/2015 |
| WO | WO2018005170 | A1 | 1/2018 |
| WO | WO2018128998 | A1 | 7/2018 |

OTHER PUBLICATIONS

Ezzeddine et al.; "An intelligent Framework for the Cooperation in the Extended Enterprise Environment", 2011, IEEE, pp. 379-384. (Year: 2011).*
Podpora et al.; "Intelligent Real-Time Adaptation for Power Efficiency in Sensor Networks", Dec. 2008, IEEE Sensors Journal, vol. 8, No. 12, pp. 2066-2073. (Year: 2008).*
Merdan et al.; "Intelligent-Agent based Approach for Assembly Automation", Jun. 2008, E Conference on Soft Computing in Industrial Applications, pp. 13-19. (Year: 2008).*
Fan Yan; "The Research of Active Data Warehouse Based on Multi-agent", 2012, IEEE, pp. 1-4. (Year: 2012).*
Koskinen et al., "Exploring Algorithms for Automated FX Trading—Constructing a Hybrid Model," Seminar on Case Studies in Operations Research, Helsinki University of Technology, 2008, pp. 1-50.
Akhtar et al., Distributed Online Banking, retrieved from <http://www.micsymposium.org/mics_2004/Akhtar.pdf>, 2004, pp. 1-14.
"International Search Report and Written Opinion of the International Searching Authority," Patent Cooperation Treaty Application No. PCT/US2017/038375, dated Sep. 12, 2017, 7 pages.
"Office Action," Singapore Patent Application No. 11201607320T, dated Nov. 15, 2017, 8 pages.
"Office Action," Singapore Patent Application No. 11201607309T, dated Nov. 15, 2017, 8 pages.
Lo, Andrew W. et al., "Foundations of Technical Analysis: Computational Algorithms, Statistical Inference, and Empirical Implementation," The Journal of Finance, vol. 55 No. 4, Aug. 2000, pp. 1705-1765.
Percival, Scott, "Backtesting and Data Mining," trade2win.com [online], Dec. 23, 2007 [retrieved on Nov. 20, 2017], Retrieved from the Internet: <URL:https://web.archive.org/web/20130601132145/http://www.trade2win.com/articles/1258-backtesting-data-mining>, 8 pages.
"International Search Report" and "Written Opinion of the International Searching Authority," Patent Cooperation Treaty Application No. PCT/US2018/012111, dated Mar. 26, 2018, 8 pages.
"Office Action," Singapore Patent Application No. 11201607309T, dated Jun. 12, 2018, 5 pages.
"Office Action," Singapore Patent Application No. 11201607320T, dated Jun. 8, 2018, 4 pages.
"Office Action," Chinese Patent Application No. 201580012482.5, dated Jun. 21, 2018, 7 pages (16 pages including translation).
Cui et al., "A nerve net invading detect model research based on inerratic detect by virtual machine running," Computer Science and Technique Department of Yunnan Police Officer Academy, Yunnan Kunming, 650223, China, Jun. 30, 2007, pp. 109-112.
"Office Action," Chinese Patent Application No. 201580012465.1, dated Jun. 21, 2018, 3 pages [5 pages including translation).
Rohit et al., "Large Data and Computation in a Hazard Map Workflow Using Hadoop and Neteeza Architectures," ACM, Nov. 18, 2013, pp. 7-12.
"Office Action," Chinese Patent Application No. 201580012482.5, dated Jan. 31, 2019, 4 pages (9 pages including translation).
"Office Action," Chinese Patent Application No. 201580012465.1, dated Feb. 1, 2019, 6 pages (12 pages including translation).
Orrantia, Jorge, "DMForex: A Data Mining Application to Predict Currency Exchange Rates and Trends," California State University Northridge Masters Thesis, 2012, pp. 1-67.
"Notice of Allowance" Singapore Patent Application No. 11201607309T, dated May 8, 2019, 6 pages.
"Notice of Allowance" Singapore Patent Application No. 11201607320T, dated May 15, 2019, 5 pages.

(56) References Cited

OTHER PUBLICATIONS

"Office Action," Chinese Patent Application No. 201580012465.1, dated Aug. 19, 2019, 6 pages (14 pages including translation).
"Office Action," Indonesian Patent Application No. P00201606735, dated Aug. 19, 2019, 2 pages (4 pages including translation).
"Office Action," Indonesian Patent Application No. P00201606736, dated Aug. 15, 2019, 2 pages (4 pages including translation).
"Office Action," Chinese Patent Application No. 201580012482.5, dated Sep. 2, 2019, 5 pages.
"International Search Report" and "Written Opinion of the International Searching Authority," Patent Cooperation Treaty Application No. PCT/US2015/019509, dated Jun. 24, 2015, 12 pages.
"International Search Report" and "Written Opinion of the International Searching Authority," Patent Cooperation Treaty Application No. PCT/US2015/019514, dated Jun. 19, 2015, 10 pages.
"Notice of Allowance" Chinese Patent Application No. 201580012482.5, dated Feb. 3, 2020, 4 pages (6 pages including translation).
"Office Action," Singapore Patent Application No. 11201811518U, dated Mar. 24, 2020, 6 pages.
"Office Action," Chinese Patent Application No. 201580012465.1, dated Apr. 23, 2020, 6 pages.
"Office Action," Singapore Patent Application No. 11201906224R, dated Aug. 20, 2020, 5 pages.
"Office Action," Chinese Patent Application No. 201580012465.1, dated Nov. 5, 2020, 10 pages (18 pages including translation).
Liu, Jiyuan, "Natural Disasters and Spatial Information System", Sep. 30, 2013, 33 pages.
"Office Action", Singapore Patent Application No. 10201906293Y, dated Feb. 9, 2021, 24 pages.
"Notice of Allowance" China Patent Application No. 201580012465.1, dated Mar. 26, 2021, 2 pages [4 pages with translation].

\* cited by examiner

SECURE INTELLIGENT NETWORKED ARCHITECTURE WITH DYNAMIC FEEDBACK

CROSS REFERENCE TO RELATED APPLICATIONS

This continuation application claims the priority benefit of U.S. Ser. No. 15/400,823 filed on Jan. 6, 2017 titled "Secure Intelligent Networked Architecture with Dynamic Feedback," which is hereby incorporated by reference in its entirety.

FIELD OF THE TECHNOLOGY

The embodiments disclosed herein are related to secure intelligent networked architecture with dynamic feedback.

SUMMARY

Provided herein are exemplary systems and methods for secure intelligent networked architecture with dynamic feedback. According to exemplary embodiments, a secure intelligent networked architecture with dynamic feedback may include a Netezza, a secure GPU communicatively coupled to the Netezza, a fusion server communicatively coupled to the Netezza, an activity server communicatively coupled to the fusion server, a secure intelligent agent communicatively coupled to the fusion server and the Netezza, and a cloud resource communicatively coupled to the Netezza, the secure GPU and the secure intelligent agent.

Further exemplary embodiments may include the Netezza configured to generate a grouping of a plurality of autonomous data structures in a data cluster structure, the Netezza configured to transmit the data cluster structure to the secure GPU, the secure GPU configured to react the data cluster structure to a historical condition to establish a performance metric, the secure GPU configured to determine a variability of a current condition, the secure GPU configured to assign a quantification token to the data cluster structure, the secure GPU configured to transmit the quantification tokenized data cluster structure to the cloud resource, the cloud resource configured to structure the quantification tokenized data cluster structure within a hierarchical framework, the secure intelligent agent configured to transmit an activation signal to the cloud resource, and the cloud resource configured to transmit the quantification tokenized data cluster structure within the hierarchical framework with the activation signal to the Netezza.

In yet further exemplary embodiments, the Netezza is configured to react the quantification tokenized data cluster structure to a simulated current condition to generate an expected performance metric, the secure intelligent agent configured to adjust an activation signal of the quantification tokenized data cluster structure on the Netezza, the Netezza configured to transmit the quantification tokenized data cluster structure and corresponding activation signal to the fusion server, the secure intelligent agent configured to adjust the activation signal of the quantification tokenized data cluster structure on the fusion server, the fusion server configured to transmit the quantification tokenized data cluster structure with corresponding activation signal to the activity server, the secure intelligent agent configured to determine an actual performance metric of the quantification tokenized data cluster structure on the activity server, the fusion server configured to adjust the activation signal of the quantification tokenized data cluster structure on the activity server, and the Netezza configured to generate a subsequent grouping of a plurality of autonomous data structures in a data cluster structure based upon the activation signal.

DETAILED DESCRIPTION OF EXEMPLARY EMBODIMENTS

Figure 1:
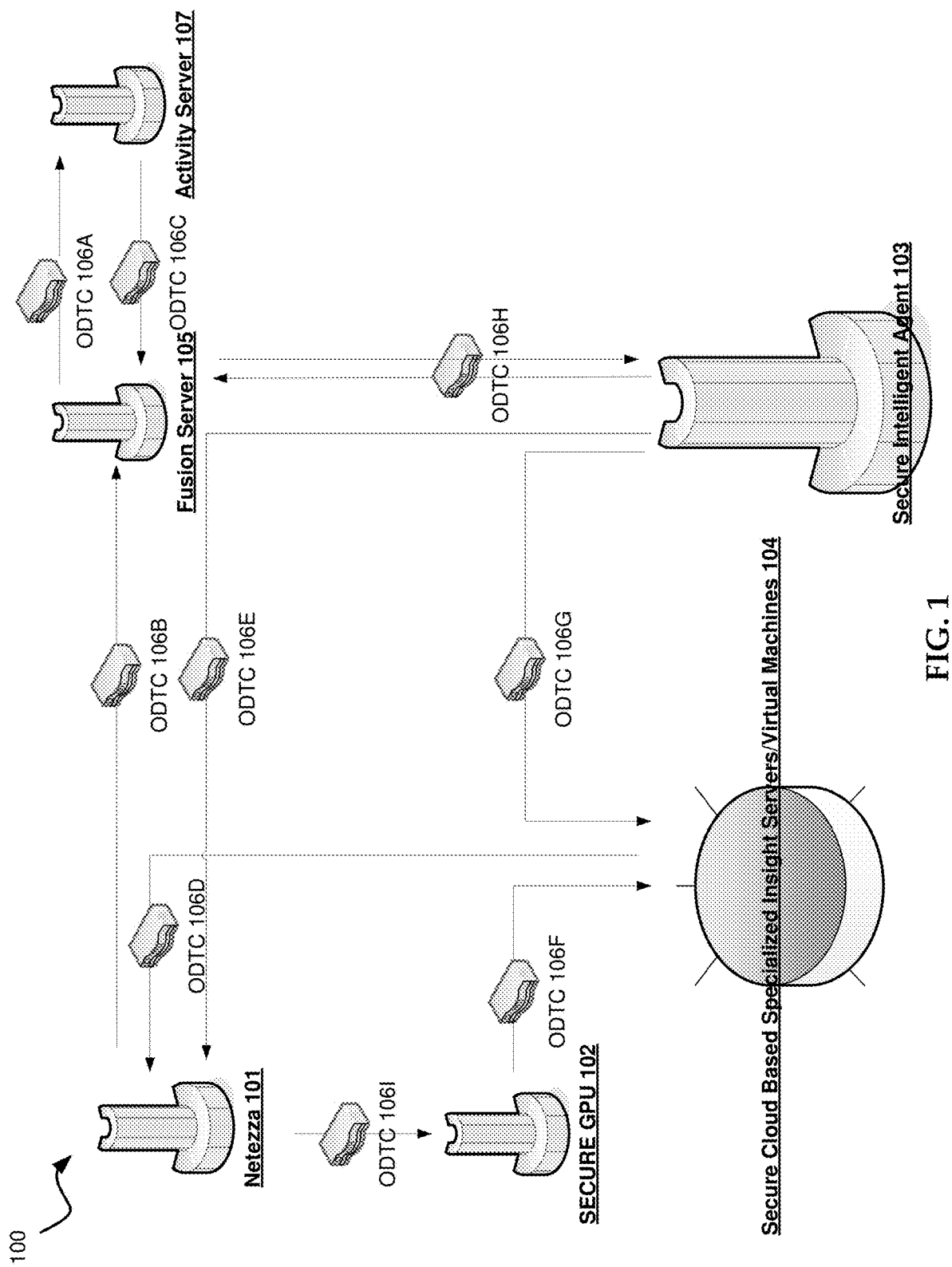
FIG. 1 is a diagram of an exemplary system for secure intelligent networked architecture with dynamic feedback.

Provided herein are exemplary systems and methods including the generation of a superior strategy for deployment to real time actual conditions with dynamic feedback to the secure intelligent networked architecture in order for adjustments to be made to the strategy being deployed to the real time actual conditions and the learned generation of subsequent strategies.

In numerous situations, third party servers exist with real time activities influenced by numerous external agents, factors and conditions. Such real time activities may comprise real time activities of one or more sports teams, companies, power grids, markets, exchanges, firms, associations, the weather or governments. These real time activities may include a high level of volatility and unpredictability. A technological problem exists in timely generating and deploying a superior strategy in the form of an autonomous data structure to the real time activities. The technological problems also include managing the autonomous data structure, and more specifically, the automatic instructing of the autonomous data structure as to how much it should react to the real time activities, including when it should turn off and/or be replaced or joined by another autonomous data structure.

Exemplary embodiments provided herein include the generation of autonomous data structures and grouping of the autonomous data structures into a data cluster structure. The data cluster structure reacts to historical conditions and is characterized by one or more performance metrics. A variability of a current condition is determined and based on the determined variability and the one or more performance metrics, a quantification token is assigned to each data cluster structure to generate a tokenized data cluster structure. A plurality of tokenized data cluster structures are structured into a hierarchical framework. An activation signal is provided to one or more data cluster structures. Each tokenized data cluster structure as programmed by its corresponding activation signal(s) reacts to simulated current conditions to generate one or more expected performance metrics. Based on the expected performance metrics, adjustments may be made to one or more of the activation signals provided to the data cluster structures. The data cluster structures and corresponding activation signals (as may be adjusted) are transmitted to an activity server. The activity server is a third party server with real time activity influenced by numerous external agents, factors and conditions as they occur. One or more actual performance metrics is determined for the tokenized data cluster structures and compared to the one or more previously expected performance metrics. Based on this comparison, further adjustment(s) may be made to one or more of the activation signals corresponding to the data cluster structures as they continue to react to the numerous external agents, factors and conditions influencing real time activity on the activity server. These adjusted activation signals may also be employed in subsequent generation of autonomous data structures and grouping into data cluster structures. As a result of these processes as they occur on a specialized hardware platform, a superior strategy is generated and deployed to real time conditions with dynamic feedback to the specialized hardware platform in order for adjustments to be made as necessary for the strategy being deployed to the real time conditions and the learned generation of subsequent strategies.

FIG. 1 is a diagram of an exemplary system for secure intelligent networked architecture with dynamic feedback.

The exemplary system 100 as shown in FIG. 1 includes a Netezza 101, a secure graphics processing unit ("GPU") 102, secure intelligent agent 103, secure cloud based specialized insight servers and/or virtual insight machines 104, fusion server 105, optional data transfer corridors 106A-106I and activity server 107.

According to exemplary embodiments, a plurality of data cluster structures may operate on the Netezza 101 or a machine capable of performing the same functions. The Netezza 101 may be an asymmetric massive parallel processing architecture, which is a two-tiered system. The first tier is a high-performance Linux SMP host that compiles data query tasks received from intelligence applications, and generates query execution plans. It then divides a query into a sequence of sub-tasks, or snippets that can be executed in parallel, and distributes the snippets to the second tier for execution. The second tier consists of one to hundreds of snippet processing blades, or S-Blades, where all the primary processing work of the appliance is executed. The S-Blades are intelligent processing nodes that make up the massively parallel processing engine of the appliance. Each S-Blade is an independent server that contains Netezza's proprietary multi-engine, high-throughput FPGAs. The S-Blade is composed of a blade-server combined with a special Netezza Database Accelerator card that snaps alongside the blade. Each S-Blade is, in turn, connected to multiple disk drives processing multiple data streams in parallel in TwinFin or Skimmer.

According to various exemplary embodiments, the IBM® Netezza® appliance has a number of hardware components that support the operation of the device. The Netezza appliance comprises one or more racks of hardware, with host servers, switches, SPUs, disks, power controllers, cooling devices, I/O cards, management modules, and cables.

The following table lists the key hardware components to monitor:

TABLE 1

| Key Netezza hardware components to monitor | | |
|---|---|---|
| Component | Description | Comments/Management Focus |
| Host servers | Each Netezza HA system has one or two host servers to run the Netezza software and supporting applications. If a system has two host servers, the hosts operate in a highly available (HA) configuration; that is, one host is the active or primary host, and the other is a standby host ready to take over if the active host fails. | Tasks include monitoring of the hardware status of the active/standby hosts, and occasional monitoring of disk space usage on the hosts. At times, the host might require Linux OS or health driver upgrades to improve its operational software. |
| Snippet processing arrays (SPAs) | SPAs contain the SPUs and associated disk storage which drive the query processing on the Netezza appliance. IBM Netezza 100 systems have one host server and thus are not HA configurations. | Tasks include monitoring of the SPA environment, such as fans, power, and temperature. SPUs and disks are monitored separately. |
| Snippet Processing Units (SPUs) | SPUs provide the CPU, memory, and Netezza FPGA processing power for the queries that run on the system. | Tasks include monitoring the status of each SPU. If a SPU fails, the disks that it "owns" are redirected to other SPUs for processing ownership. |
| Storage group | In the IBM Netezza High Capacity Appliance C1000 model, disks reside within a storage group. The storage group consists of three disk enclosures: an intelligent storage enclosure with redundant hardware RAID controllers, and two expansion disk enclosures. There are four storage groups in each Netezza C1000 rack. | Tasks include monitoring the status of the disks within the storage group. |
| Disks | Disks are the storage media for the user databases and tables that are managed by the Netezza appliance. | Tasks include monitoring the health and status of the disk hardware. If a disk fails, tasks include regenerating the disk to a spare and replacing the disk. |
| Data slices | Data slices are virtual partitions on the disks. They contain user databases and tables, and their content is mirrored to ensure HA access to the data in the event of a disk failure. | Tasks include monitoring the mirroring status of the data slices and also the space consumption of the data slice. |
| Fans and blowers | These components control the thermal cooling for the racks and components such as SPAs and disk enclosures. | Tasks include monitoring the status of the fans and blowers, and if a component fails, replacing the component to ensure proper cooling of the hardware. |
| Power | These components provide electrical | Tasks include monitoring the status of |

TABLE 1-continued

Key Netezza hardware components to monitor

| Component | Description | Comments/Management Focus |
|---|---|---|
| supplies | power to the various hardware components of the system. | the power supplies, and if a component fails, replacing the component to ensure redundant power to the hardware. |

The secure graphics processing unit (GPU) 102, is a specialized electronic circuit designed to rapidly manipulate and alter memory to accelerate the creation of images in a frame buffer intended for output to a display. The processes performed by the GPU may include:

Motion compensation (mocomp);
Inverse discrete cosine transform (iDCT);
Inverse telecine 3:2 and 2:2 pull-down correction;
Inverse modified discrete cosine transform (iMDCT);
In-loop deblocking filter;
Intra-frame prediction;
Inverse quantization (IQ);
Variable-length decoding (VLD) or slice-level acceleration;
Spatial-temporal deinterlacing and automatic interlace/progressive source detection; and
Bitstream processing (Context-adaptive variable-length coding/Context-adaptive binary arithmetic coding) and perfect pixel positioning.

The secure intelligent agent 103, according to some exemplary embodiments (although not limited to), is a non-generic computing device comprising non-generic computing components. It may comprise specialized dedicated hardware processors to determine and transmit digital data elements. In further exemplary embodiments, the secure intelligent agent 103 comprises a specialized device having circuitry, load balancing, and specialized hardware processors, and artificial intelligence, including machine dynamic learning. Numerous determination steps by the secure intelligent agent 103 as described herein may be made by an automatic machine determination without human involvement, including being based on a previous outcome or feedback (e.g. an automatic feedback loop) provided by the secure intelligent networked architecture, processing and/or execution as described herein.

The secure cloud based specialized insight servers and/or virtual insight machines 104 (aka "cloud resource") may be specialized insight servers and/or virtual insight machines, according to various exemplary embodiments, and receive at least one digital data element from the secure intelligent agent 103. The secure cloud based specialized insight servers and/or virtual insight machines 104, according to various exemplary embodiments, utilize massive sophisticated computing resources as described herein to produce transformed digital data, files, scrubbed files and/or visually perceptible digital data elements.

In certain exemplary embodiments, the secure cloud based specialized insight servers and/or virtual insight machines 104 further comprise a master virtual machine server including a single secure cloud resource responsible for generating all of or most of the herein described virtual machines.

According to various exemplary embodiments, a virtual machine may comprise an emulation of a particular computer system. Virtual machines operate based on the computer architecture and functions of a real or hypothetical computer, and their implementations may involve specialized hardware, software, or a combination of both.

In further exemplary embodiments, a Virtual Machine Management Interface is configured to a cluster of cloud computing instances for processing large amounts of data. The Virtual Machine Management Interface serves as the user interface to handle the ordering and cancelling of virtual computing instances. Additionally, the Virtual Machine Management Interface may allow for detailed customization of the virtual machines. For example, Random Access Memory ("RAM"), processor speed, number of processors, network details, security/encryption, and/or memory may be detailed for each virtual machine and/or all virtual machines. Once the cluster of cloud computing instances is ordered and running, the Virtual Machine Management Interface is "listening" for idle machines and "assigning" any idle machine processing responsibilities.

A cloud-based computing environment is a resource that typically combines the computational power of a large grouping of processors and/or that combines the storage capacity of a large grouping of computer memories or storage devices.

For example, 150 8-core virtual machines may be utilized to process hundreds of billions of calculations in three to four hours.

Additionally, each virtual machine may transform historical data and performance data into a neural network usable data set. In some exemplary embodiments, a neural network usable data set comprises an aggregation of data points organized into one or more sets.

For example, for a particular time period, such as each day (or each minute, hour, month, year(s), decades, etc.), for any particular item, historical data and performance data are grouped together as a data set.

According to further embodiments, each virtual machine may create a neural network base. The neural network base, along with the neural network usable data set forms a neural network. Creating a neural network base, according to some exemplary embodiments, includes processing a layer of input data and then processing that data algorithmically to compare the output of algorithms against known output.

A neural network base may comprise a set of algorithms used to approximate against data inputs. These algorithms are able to store tested values within itself and store an error rate.

A neural network may comprise a neural network base and its underlying algorithms in tandem with a neural network usable data set. The neural network usable data set may function as a data feeder for the neural network base to calculate and/or otherwise interact with.

In various exemplary embodiments, feeding of a data point may be performed by the neural network iteratively requesting to process the next data point in the usable data set.

Data points, according to many exemplary embodiments, may include but are not limited to performance data and historical data that the neural network has access to as part of its useable data set.

According to various exemplary embodiments, a library may comprise hundreds of thousands of autonomous data structures. Decisions to allocate resources to the autonomous data structures may be based on their historical performance in particular conditions, so maintaining up to date information on the library is accomplished by the exemplary systems and methods described and illustrated herein.

Further exemplary embodiments include an Omni Virtual Machine Management Interface, which is an all-in-one desktop application that controls the ordering of CCIs (Cloud Computing Instances) and serves as the manager these CCI's to distribute processing tasks to each machine. By launching as many cloud instances as needed to accomplish the task of testing all of the autonomous data structures provides the real time determination of the best performing autonomous data structures and/or autonomous data cluster structures.

The fusion server 105, according to various exemplary embodiments and as described herein, is where quantification tokenized data cluster structures react to real time actual conditions. According to various exemplary embodiments, a feedback signaling loop from the secure intelligent agent 103 transmits to the fusion server 105 adjusted activation signals corresponding to the respective quantification tokenized data cluster structures. The fusion server 105 also transmits the quantification tokenized data cluster structures with corresponding activation signals (as may be adjusted) to the activity server 107. The secure intelligent agent 103 determines the actual performance metric(s) of the quantification data cluster structures on the activity server 107 (as accessed by the secure intelligent agent 103 from the fusion server 105) and compares it to the expected performance metric(s).

According to further exemplary embodiments, one or more optional data transfer corridors, such as optional data transfer corridors 106A-106I, may be installed at certain locations in the intelligent networked architecture. The optional data transfer corridors are hardware-based secure, high speed data transfer corridors, each having specialized processors and switches. The optional data transfer corridors facilitate the unilateral or bilateral transfer of massive amounts of data especially in those situations where the extremely quick transfer of massive amounts of data is required.

The activity server 107, according to exemplary embodiments, is a third party server with real time activity influenced by numerous external agents, factors and conditions. The activity server 107 receives secure instructions from the fusion server 105. In some exemplary embodiments, the activity server 107 comprises real time activities of one or more sports teams, companies, markets, power grids, exchanges, firms or associations.

Figure 2A:
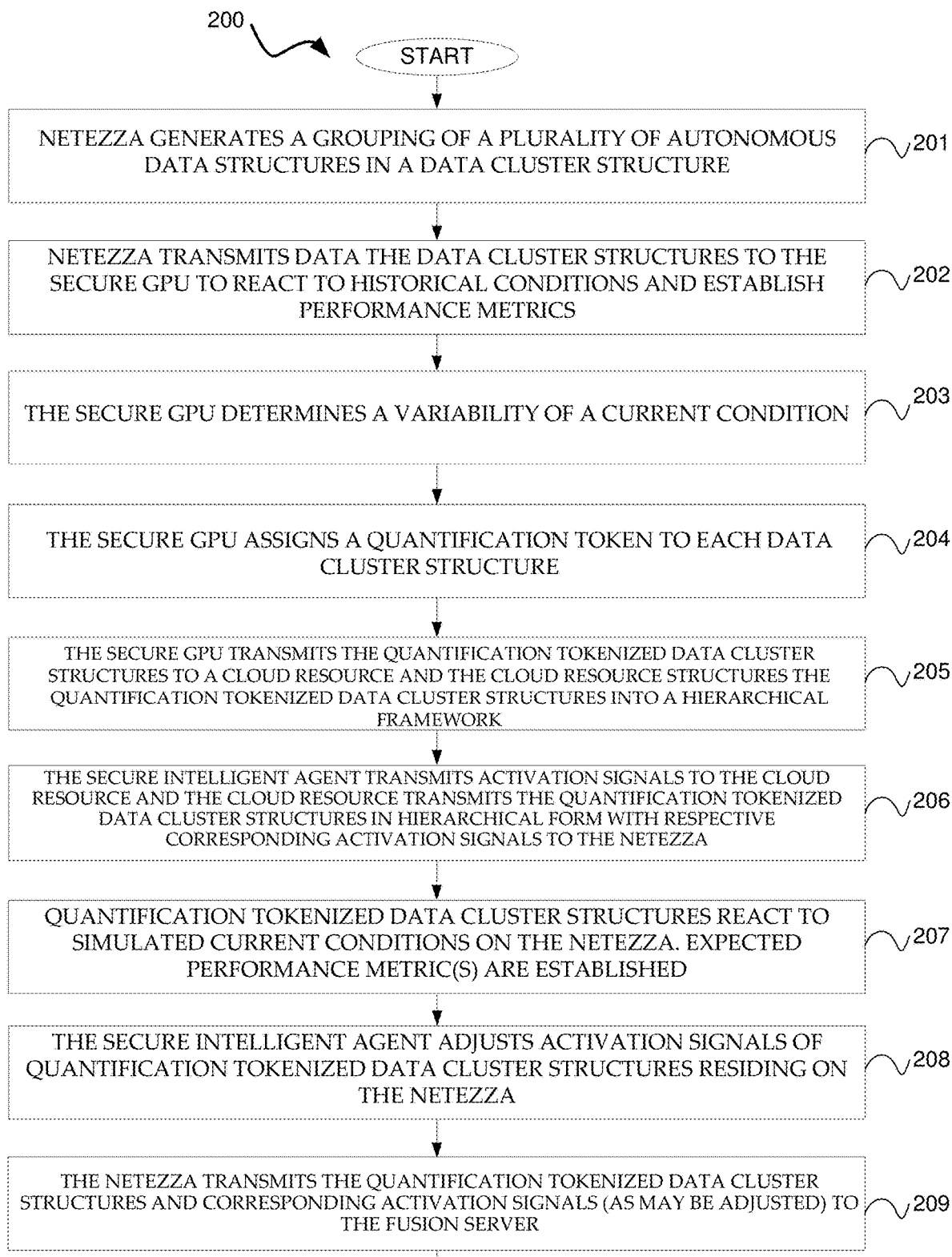
FIGS. 2A-2B represent a flowchart of an exemplary method for secure intelligent networked architecture with dynamic feedback.
Figure 2B:
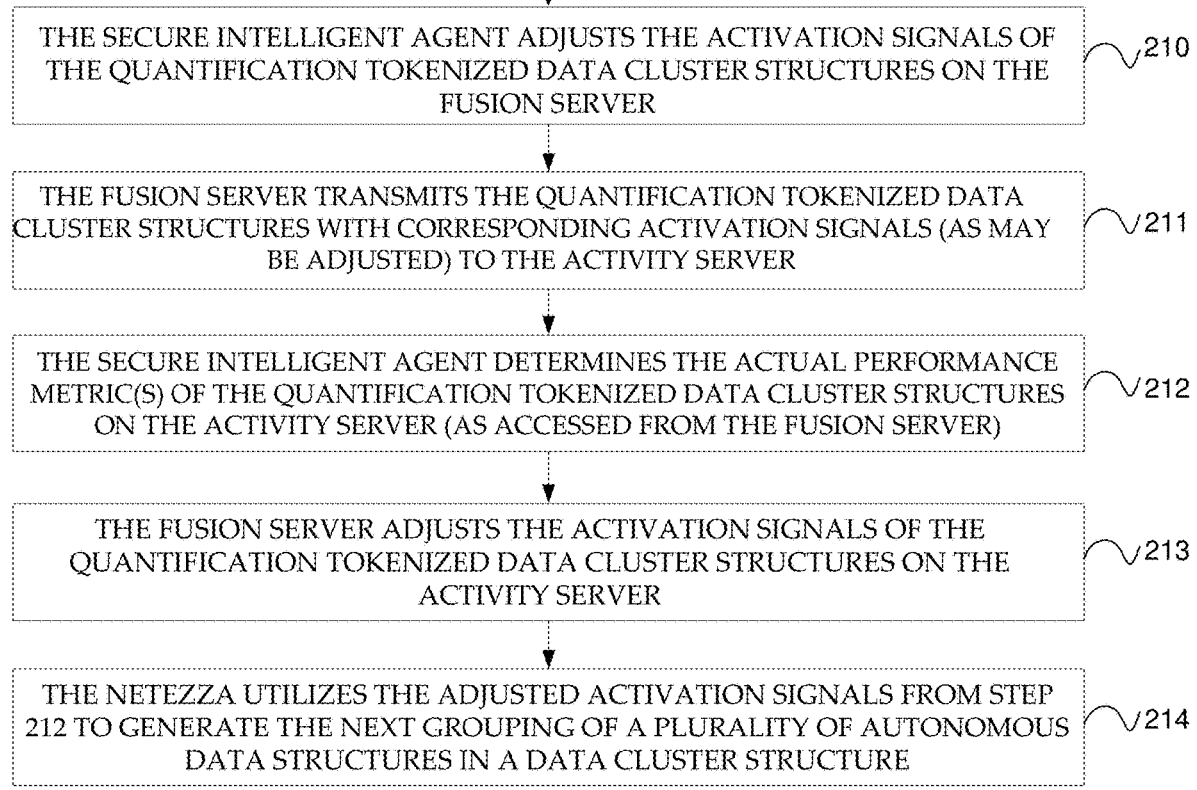

FIG. 2 is a diagram of an exemplary method 200 for secure intelligent networked architecture with dynamic feedback. According to various exemplary embodiments, an autonomous data structure generates an electrical current or other type of signal in response to a condition. The electrical current or other type of signal may generate a measurable action. For example, an autonomous data structure may comprise IF X, then Y, where X is the condition and Y is the response to the condition. Other autonomous data structures may comprise multiple conditions and/or responses. Conditions may include any of time, activity, weather, sports scores, cost, price, volume, frequency, and the like. Responses may include yes, no, wait, start a particular player, take no action, buy, sell, short, hold, and the like.

At step 201, the Netezza 101 (FIG. 1) generates a grouping of a plurality of autonomous data structures in a data cluster structure based upon one or more shared characteristics, including how the autonomous data structures generate electrical currents or other types of signals in response to a particular condition.

For example, an autonomous data structure may predict a future average daily temperature for a particular region under certain conditions, such as during the winter. This autonomous data structure may be grouped with other autonomous data structures for the same region and/or condition to form a data cluster structure. Numerous data cluster structures may be formed.

According to exemplary embodiments, a plurality of data cluster structures may operate on a Netezza asymmetric massively parallel processing architecture, which is a two-tiered system. The first tier is a high-performance Linux SMP host that compiles data query tasks received from intelligence applications, and generates query execution plans. It then divides a query into a sequence of sub-tasks, or snippets that can be executed in parallel, and distributes the snippets to the second tier for execution. The second tier consists of one to hundreds of snippet processing blades, or S-Blades, where all the primary processing work of the appliance is executed. The S-Blades are intelligent processing nodes that make up the massively parallel processing engine of the appliance. Each S-Blade is an independent server that contains Netezza's proprietary multi-engine, high-throughput FPGAs. The S-Blade is composed of a blade-server combined with a special Netezza Database Accelerator card that snaps alongside the blade. Each S-Blade is, in turn, connected to multiple disk drives processing multiple data streams in parallel in TwinFin or Skimmer.

At step 202, the Netezza 101 transmits the data cluster structures to the secure GPU 102 (FIG. 1) to react to historical conditions and establish performance metrics. For example, a historical condition could be the average daily wind speed for a particular region over the course of the last several years. A data cluster structure may comprise autonomous data structures grouped together based on responding well (e.g. correctly predicting the average daily temperature of the following day for a particular region based upon the average daily wind speed for the previous two weeks).

The secure GPU 102, according to exemplary embodiments, is a specialized electronic circuit designed to rapidly manipulate and alter memory to accelerate the creation of images in a frame buffer intended for output to a display. The processes performed by the secure GPU 102 may include:

Motion compensation (mocomp);
Inverse discrete cosine transform (iDCT);
Inverse telecine 3:2 and 2:2 pull-down correction;
Inverse modified discrete cosine transform (iMDCT);
In-loop deblocking filter;
Intra-frame prediction;
Inverse quantization (IQ);
Variable-length decoding (VLD) or slice-level acceleration;
Spatial-temporal deinterlacing and automatic interlace/progressive source detection; and
Bitstream processing (Context-adaptive variable-length coding/Context-adaptive binary arithmetic coding) and perfect pixel positioning.

During step 202, performance metrics are established to quantify the measurable actions undertaken by the one or more data cluster structures in response to the historical conditions. For example, with respect to the data cluster structure of autonomous data structures grouped together based on responding well (e.g. correctly predicting the average daily temperature of the following day), a performance metric may be how many degrees each autonomous data structure within the data cluster structure came within to predicting the actual average daily temperature of any particular day(s).

At step 203, in various exemplary embodiments, the secure GPU 102 determines a variability of a current condition. In some exemplary embodiments, this is performed by applying a predetermined time period for determining the sampling of the variability of the current condition. For example, the variability of a current condition might comprise the variance of the average daily temperature in a particular region for the last thirty days.

At step 204, the secure GPU 102 assigns a quantification token to each data cluster structure to generate a quantification tokenized data cluster structure. According to various exemplary embodiments, the quantification token is based on the variability of the current condition determined at step 203 and the performance metrics established at step 202. For example, a quantification token for the data cluster structure of autonomous data structures grouped together based on responding well (e.g. correctly predicting the average daily temperature of the following day in a particular region) would be based on how many degrees each autonomous data structure within the data cluster structure came within to predicting the actual average daily temperature of the particular day(s) and the variance of the average daily temperature in the particular region for the last thirty days.

At step 205, the secure GPU 102 transmits the quantification tokenized data cluster structures to a cloud resource 104 (FIG. 1) and the cloud resource 104 structures the quantification tokenized data cluster structures into a hierarchical framework based on the quantification tokens. For example, the hierarchical framework may be vertically structuring each quantification tokenized data cluster structure in ascending order based on a value of each quantification token of any particular tokenized data cluster structure.

At step 206, the secure intelligent agent 103 (FIG. 1) transmits activation signals to the cloud resource 104, and the cloud resource transmits the quantification tokenized data cluster structures in hierarchical form with the respective corresponding activation signals to the Netezza 101.

According to exemplary embodiments, the activation signal represents a magnitude a quantification tokenized data cluster structure reacts in response to a condition. According to exemplary embodiments, the activation signal is a function of a position of a quantification tokenized data cluster structure within the hierarchical framework. Activation signals, according to various exemplary embodiments, are a finite resource that need to be prioritized based on various factors. For example, in a hierarchy of 100 quantification tokenized data cluster structures comprising autonomous data structures for predicting a future average daily temperature for a particular region, 10 quantification tokenized data cluster structures may receive activation signals. In the hierarchical framework that is vertically structured in ascending order, this may represent the top 10 quantification tokenized data cluster structures receiving activation signals. Additionally, the distribution of activation signals across the top 10 quantification tokenized data cluster structures may vary. For example, the quantification tokenized data cluster structure ranked number one of ten total quantification tokenized data cluster structures may receive twenty-five activation signals of a total of 100 activation signals to be distributed, while the quantification tokenized data cluster structure ranked number ten may receive five activation signals of the 100 total activation signals.

At step 207, the quantification tokenized data cluster structures react to simulated current conditions on the Netezza 101. Expected performance metrics are established to quantify the quantification tokenized data cluster structures in response to the simulated current conditions. For example, the top 10 quantification tokenized data cluster structures for predicting a future average daily temperature for a particular region (from step 206) may react to the average daily wind speed for that particular region for the previous two weeks. An expected performance metric may comprise ranking the ten quantification tokenized data cluster structures based on the ability to predict the actual average daily temperature.

At step 208, the secure intelligent agent 103 adjusts the activation signals of the quantification tokenized data cluster structures residing on the Netezza 101. According to exemplary embodiments, a feedback signaling loop from the secure intelligent agent 103 transmits to the Netezza 101 adjusted activation signals corresponding to the respective quantification tokenized data cluster structures. For example, referring to step 206, the tenth ranked quantification tokenized data cluster structure with five activation signals may be performing the best at predicting the actual average daily temperatures, while the first ranked quantification tokenized data cluster structure with twenty-five activation signals may be performing the worst at predicting the actual average daily temperatures. Accordingly, the secure intelligent agent 103 will transmit to the Netezza 101 instructions to adjust the first ranked quantification tokenized data cluster structure to have five activation signals and to adjust the tenth ranked quantification tokenized data cluster structure to have twenty-five activation signals.

At step 209, according to exemplary embodiments, the Netezza 101 transmits the quantification tokenized data cluster structures and corresponding activation signals (as may be adjusted) to the fusion server 105 (FIG. 1). At the fusion server 105, the quantification tokenized data cluster structures react to real time actual conditions. Performance metrics are established to quantify the measurable actions undertaken by the quantification tokenized data cluster structures in response to the actual conditions.

For example, referring to step 208, the Netezza 101 may transmit the top ten quantification tokenized data cluster structures (as adjusted) to the fusion server 105, where they will react to real time actual conditions for a particular region in order to predict future average daily temperatures for that particular region.

At step 210, the secure intelligent agent 103 adjusts the activation signals of the quantification tokenized data cluster structures on the fusion server 105. According to various exemplary embodiments, a feedback signaling loop from the secure intelligent agent 103 transmits to the fusion server 105 adjusted activation signals corresponding to the respective quantification tokenized data cluster structures. For example, this step may be performed in a fashion similar to that performed at step 208.

At step 211, the fusion server 105 transmits the quantification tokenized data cluster structures with corresponding activation signals (as may be adjusted) to the activity server 107 (FIG. 1). The activity server 107, according to exemplary embodiments, is a third party server with real time activity influenced by numerous external agents, factors and conditions. In some exemplary embodiments, the activity server 107 comprises real time activity of one or more sports teams, companies, markets, exchanges, firms or associations.

For example, the fusion server 105 may transmit the quantification tokenized data cluster structures (as adjusted at step 210) for predicting future average daily temperatures for a particular region to the activity server 107. At the activity server 107, the quantification tokenized data cluster structures will react to real time actual current conditions for the particular region in order to predict future average daily temperatures. For example, today a quantification tokenized data cluster structure may predict based on real time actual current conditions for a particular region that the future average daily temperature for that particular location for tomorrow will be 70 degrees, and the activity server 107 tomorrow may reflect that the actual average daily temperature for the same region was 71 degrees. Thus, the prediction was one degree lower than the actual outcome.

At step 212, the secure intelligent agent 103 determines the actual performance metric(s) of the quantification tokenized data cluster structures on the activity server 107 (as accessed by the secure intelligent agent 103 from the fusion server 105) and compares it to the expected performance metric(s) determined at step 207. Based on this determination, the secure intelligent agent 103 will transmit adjusted activation signals to the fusion server 105 and to the Netezza 101.

At step 213, the fusion server 105 adjusts the activation signals of the quantification tokenized data cluster structures on the activity server 107. According to various exemplary embodiments, a feedback signaling loop from the fusion server 105 transmits to the activity server 107 adjusted activation signals corresponding to the respective quantification tokenized data cluster structures. For example, this step may be performed in a fashion similar to that performed at step 208.

At step 214, the Netezza 101 utilizes the adjusted activation signals from step 212 to generate the next grouping of a plurality of autonomous data structures in a data cluster structure based upon one or more shared characteristics, including how the autonomous data structures generate electrical currents or other types of signals in response to a particular condition.

Another exemplary application of the systems and methods described herein is with respect to the allocation of power to a power grid. By looking back at an evaluation period of historical usage by day(s), month(s), year(s), an estimate for future power needs for a power grid may be determined. Such an estimate may be correlated with weather conditions associated with the particular evaluation period, in order to improve the estimate. Based on the estimate, power may be allocated to the power grid. As power is allocated to the power grid, dynamic adjustments may be made to the amount of power allocated due to real-time unanticipated events, such as unexpected weather conditions, equipment malfunctions, etc.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed:

1. A secure intelligent networked architecture with dynamic feedback comprising:
    an asymmetric parallel processing appliance, the appliance having asymmetric parallel processing architecture and a two-tiered data processing system;
    a secure GPU communicatively coupled to the appliance;
    a fusion server communicatively coupled to the appliance;
    an activity server communicatively coupled to the fusion server;
    a secure intelligent agent communicatively coupled to the fusion server and the appliance, the secure intelligent agent being configured to adjust an activation signal of a quantification tokenized data cluster structure on the appliance; and
    a cloud resource communicatively coupled to the appliance, the secure GPU and the secure intelligent agent.

2. The secure intelligent networked architecture with dynamic feedback of claim 1 further comprising:
    the appliance configured to generate a grouping of a plurality of autonomous data structures in a data cluster structure.

3. The secure intelligent networked architecture with dynamic feedback of claim 2 further comprising:
    the appliance configured to transmit the data cluster structure to the secure GPU.

4. The secure intelligent networked architecture with dynamic feedback of claim 3 further comprising:
    the secure GPU configured to react the data cluster structure to a historical condition to establish a performance metric.

5. The secure intelligent networked architecture with dynamic feedback of claim 4 further comprising:
    the secure GPU configured to determine a variability of a current condition.

6. The secure intelligent networked architecture with dynamic feedback of claim 5 further comprising:
    the secure GPU configured to assign a quantification token to the data cluster structure.

7. The secure intelligent networked architecture with dynamic feedback of claim 6 further comprising:
    the secure GPU configured to transmit the quantification tokenized data cluster structure to the cloud resource.

8. The secure intelligent networked architecture with dynamic feedback of claim 7 further comprising:
    the cloud resource configured to structure the quantification tokenized data cluster structure within a hierarchical framework.

9. The secure intelligent networked architecture with dynamic feedback of claim 8 further comprising:
    the secure intelligent agent configured to transmit the activation signal to the cloud resource.

10. The secure intelligent networked architecture with dynamic feedback of claim 9 further comprising:
    the cloud resource configured to transmit the quantification tokenized data cluster structure within the hierarchical framework with the activation signal to the appliance.

11. The secure intelligent networked architecture with dynamic feedback of claim 10 further comprising:

the appliance configured to react the quantification tokenized data cluster structure to a simulated current condition to generate an expected performance metric.

12. The secure intelligent networked architecture with dynamic feedback of claim 1 further comprising:

the appliance configured to transmit the quantification tokenized data cluster structure and the corresponding activation signal to the fusion server.

13. The secure intelligent networked architecture with dynamic feedback of claim 1 further comprising:

the secure intelligent agent configured to adjust the activation signal of the quantification tokenized data cluster structure on the fusion server.

14. The secure intelligent networked architecture with dynamic feedback of claim 1 further comprising:

the fusion server configured to transmit the quantification tokenized data cluster structure with the corresponding activation signal to the activity server.

15. The secure intelligent networked architecture with dynamic feedback of claim 1 further comprising:

the secure intelligent agent configured to determine an actual performance metric of the quantification tokenized data cluster structure on the activity server.

16. The secure intelligent networked architecture with dynamic feedback of claim 1 further comprising:

the fusion server configured to adjust an activation signal of the quantification tokenized data cluster structure on the activity server.

17. The secure intelligent networked architecture with dynamic feedback of claim 1 further comprising:

the appliance configured to generate a subsequent grouping of a plurality of autonomous data structures in a data cluster structure based upon an activation signal.

* * * * *